United States Patent
Seibold et al.

(10) Patent No.: US 6,566,810 B1
(45) Date of Patent: May 20, 2003

(54) DISCHARGE LAMP WITH DIELECTRICALLY INHIBITED ELECTRODES

(75) Inventors: Michael Seibold, Munich (DE); Michael Ilmer, Augsburg (DE); Angela Eberhardt, Augsburg (DE)

(73) Assignee: Patent-Treuhand-Gesellschaft fuer Elektrische Gluehlampen mBH, Munich (DE)

( * ) Notice: Subject to any disclaimer, the term of this patent is extended or adjusted under 35 U.S.C. 154(b) by 0 days.

(21) Appl. No.: 09/554,667
(22) PCT Filed: Aug. 28, 1999
(86) PCT No.: PCT/DE99/02703
 § 371 (c)(1),
 (2), (4) Date: May 18, 2000
(87) PCT Pub. No.: WO00/17910
 PCT Pub. Date: Mar. 30, 2000

(30) Foreign Application Priority Data

Sep. 22, 1998 (DE) ............................. 198 43 419

(51) Int. Cl.$^7$ ............................................ H01J 17/49
(52) U.S. Cl. ..................... 313/582; 313/586; 313/587
(58) Field of Search ............................... 313/491, 492, 313/493, 590, 595, 596, 631, 632, 634, 582, 586, 587

(56) References Cited

U.S. PATENT DOCUMENTS

| | | | | |
|---|---|---|---|---|
| 4,207,488 A | * | 6/1980 | Aboelfotoh | 313/221 |
| 4,701,827 A | * | 10/1987 | Fujikawa et al. | 361/309 |
| 5,246,890 A | * | 9/1993 | Aitken et al. | 501/15 |
| 5,281,560 A | * | 1/1994 | Francis et al. | 501/15 |
| 5,977,708 A | * | 11/1999 | Amatsu et al. | 313/586 |
| 6,246,171 B1 | * | 6/2001 | Vollkommer et al. | 313/586 |
| 6,304,028 B1 | * | 10/2001 | Vollkommer et al. | 313/491 |

FOREIGN PATENT DOCUMENTS

| | | |
|---|---|---|
| EP | 0 348 979 | 1/1990 |
| WO | 94/23442 | 10/1994 |
| WO | 98/43276 | 10/1998 |
| WO | 98/43277 | 10/1998 |

OTHER PUBLICATIONS

Patent Abstracts of Japan, vol. 1997, No. 03, Mar. 31, 1997 & JP 08 287871 A (Stanley Electric Co Ltd), Nov. 1, 1996 abstract.
Patent Abstracts of Japan, vol. 010, No. 370, (E–463) Dec. 10, 1986 & JP 61 165946 A (Mitsubishi Electric Corp), Jul. 26, 1986 abstract.
Patent Abstracts of Japan, vol. 1998, No. 13, Nov. 30, 1998 & JP 10 228884 A (Toshiba Lighting &Amp; Technol Corp), Aug. 25, 1998 abstract.
Patent Abstracts of Japan, vol. 010, No. 370 (E–463), Dec. 10, 1986 & JP 61 165945 A (Mitsubishi Electric Corp), Jul. 26, 1986 abstract.

* cited by examiner

*Primary Examiner*—Robert H. Kim
*Assistant Examiner*—Jurie Yun
(74) *Attorney, Agent, or Firm*—Robert F. Clark

(57) ABSTRACT

A discharge lamp, suitable for operating by means of a dielectrically impeded discharge, and having metal electrodes arranged on the wall of the discharge vessel has at least one dielectric impeding layer which covers at least a portion of the electrodes. According to the invention, the electrodes are additionally covered directly with a barrier layer, in particular made from sintered glass ceramic, that is to say the barrier layer is, if appropriate, respectively arranged between the electrode and the dielectric impeding layer. The result of this is to prevent metal ions from diffusing out of the electrodes into the dielectric impeding layer and undesirably influencing the properties thereof. Moreover, it is possible in this way to prevent the electrode tracks from evaporating or being sputtered away during operation of the lamp.

16 Claims, 2 Drawing Sheets

DISCHARGE LAMP WITH DIELECTRICALLY INHIBITED ELECTRODES

TECHNICAL FIELD

Here, the term "discharge lamp" covers sources of electromagnetic radiation based on gas discharges. The spectrum of the radiation can in this case comprise both the visible region and the UV (ultraviolet)/VUV(vacuum ultraviolet) region as well as the IR (infrared) region. Furthermore, it is also possible to provide a fluorescent layer for converting invisible into visible radiation.

What is involved here are discharge lamps with so-called dielectrically impeded electrodes. The electrodes as such are typically implemented in the form of thin metal strips or layer structures resembling conductor tracks, for example made from conductive silver, at least a portion of which layer structures is arranged on the inner wall of the discharge vessel, for example by means of a printing method such as screen printing or the like. At least a portion of these inner wall electrodes is entirely covered with respect to the interior of the discharge vessel with a dielectric layer which functions during operation of the lamp as a dielectric impediment with reference to the discharge.

If only the electrodes of a single polarity—preferably the anodes—are covered with such a dielectric impeding layer, in the preferred unipolar pulsed operation (WO94/23442) a so-called unilaterally dielectrically impeded discharge is formed which comprises a multiplicity of delta-shaped partial discharges. If, by contrast, all the electrodes, that is to say of both types of polarity, are covered with a dielectrically impeding layer, a so-called bilaterally dielectrically impeded discharge is formed both in the unipolar and in the bipolar operation. In the bipolar operation, for example with ac voltage, or else bipolar pulses (WO94/23442), each electrode alternately undertakes the role both of the anode and of the cathode.

However, it has proved in the case of such lamps that metal ions diffuse out of the electrodes into the dielectric impeding layer and can undesirably influence its properties with reference to its function as a dielectric impediment for the discharge.

In addition, unilateral dielectric impediment is further attended by the problem that metal particles of the unimpeded inner wall electrodes evaporate during the production of the lamp, for example during the burning-in process of the dielectric layer, thermal joining processes and the like, and can possibly be deposited in an uncontrolled fashion inside the lamp. Moreover, in some circumstances the conductivity of the electrode tracks decreases. Said problem is the more pronounced the higher the temperature (in particular, higher than 400° C.) and the longer the time during which this temperature prevails. During operation of the lamp, in addition, metal particles can be extracted from the unimpeded electrodes by sputtering processes, and can likewise be deposited on the discharge vessel wall. The metal deposition on the discharge vessel wall leads to a reduction in the luminous flux of the lamp. Moreover, the thickness and width of the typically strip-shaped electrodes influence the current-carrying capacity thereof, and this can become critical, in particular in the case of strong pulsed currents. In addition, the electrode width has the effect on the capacitance of the electrode arrangement which directly influences the dielectrically impeded discharge. Moreover, the striking distance can be partially reduced, something which has a negative influence on the uniformity of the discharge. This holds in particular for the case, explained in more detail in the exemplary embodiments, when the cathode tracks are provided with projections on which the delta-shaped partial discharges attach themselves.

A further functional layer, for example a layer made from a fluorescent material or a mixture of fluorescent materials and/or one or else a plurality of reflecting layers for visible radiation (light) and/or UV radiation can be applied to the dielectric impeding layer and, in general, also to further parts of the inner wall of the discharge vessel. If appropriate, the reflecting layer serves the aim of bringing visible light outside in a specific fashion, that is to say only in a specified preferred direction of the lamp. However, porous layers such as, for example, a layer of fluorescent material provide only a reduced protection against metal ions evaporating or sputtering off out of the electrode tracks. Moreover, the electrode tracks are, in any case, entirely unprotected up until these layers are applied during the burning-in processes.

The geometric shape of the discharge vessel is not subject to any particular restrictions. Tubular or else flat discharge vessels are customary, for example. The latter are suitable, inter alia as so-called flat lamps for backlighting liquid-crystal display screens (LCD). Reference may be made, for example, to DE 197 18 395 C1 or WO 98/43277 with regard to the technical details of such lamps.

SUMMARY OF THE INVENTION

It is the object of the present invention to avoid the disadvantages mentioned and to provide a discharge lamp which has an improved design with regard to the long-term performance, in particular also with regard to thinning of the electrodes by diffusion and reducing the influence of the metal electrodes on the dielectric layer.

According to the invention, in the case of the unilaterally dielectric impediment of at least that portion of the inner wall electrodes which is covered with a dielectric impeding layer, is additionally directly covered with a barrier layer, that is to say that the additional barrier layer is respectively arranged between the inner wall electrodes and the dielectric impeding layer. In other words, in this case the arrangement of the layers is as follows, viewed starting from the inner wall of the discharge vessel: electrode layer, barrier layer, dielectric impeding layer. In order to prevent metal particles from evaporating and sputtering off from the electrodes, which was mentioned at the beginning, it is advantageous also to cover the dielectrically unimpeded inner wall electrodes with such a barrier layer.

In the case of bilateral dielectric impediment, according to the invention all the inner wall electrodes, that is to say electrodes of both types of polarity, are directly covered with the barrier layer. The barrier layer is finally followed by the customary dielectric impeding layer.

The barrier layer should cover at least the entire electrode in each case, but can, if appropriate, also be applied "over the entire surface", that is to say that in the latter case all the electrodes including the discharge vessel wall on which the electrodes are arranged are covered with a single coherent barrier layer. The application of the typically initially pasty barrier layer is performed by standard methods such as spraying, dispensing, rolling, screen printing, or silk screen printing etc.

The barrier layer comprises a dielectric, for example a glass solder, which in addition to preventing evaporation and sputtering away, also prevents metal ions of electrodes from diffusing through the barrier layer into the dielectric impeding layer which is important for the dielectrically impeded discharge. At least partially crystallized or crystallized glass solders, so-called sintered glass ceramics, in particular bismuth borosilicate glass (Bi—B—Si—O), have proved to be suitable in this regard. Further suitable crystallized glass solders are, for example, zinc bismuth borosilicate glass (Zn—Bi—B—Si—O), tin zinc phosphate glass (Sn—Zn—P—O) and zinc borosilicate glass (Zn—B—Si—O). For the sake of brevity, and in the interest of better terminological delimitation by comparison with the dielectric impeding layer provided for dielectrically impeding the electrodes, the dielectric layer acting as a diffusion, evaporation and sputtering-off barrier layer is also denoted below simply as a (dielectric) barrier layer.

It has proved to be sufficient for the effect according to the invention when the thickness of this barrier layer is of the order of magnitude of at least approximately 1 $\mu$m. The thickness of the barrier layer is typically in the range of between 1 $\mu$m and 40 $\mu$m, preferably in the range of between 1 $\mu$m and 30 $\mu$m, particularly preferably in the range of between 5 $\mu$m and 20 $\mu$m. In practice, thicknesses of typically a few $\mu$m, for example 6 $\mu$m, have proved to be effective. In any case, the thickness of the barrier layer is smaller than the thickness of the impeding layer. Moreover, it is essential that the barrier layer be present in a truly partially crystallized state.

The dielectric impeding layer can be applied to the individual electrodes both in a strip-shaped fashion (for unilateral and bilateral dielectric impediment) and—in the case of the bilaterally dielectrically impeded discharge—"over the entire area" by means of a single coherent barrier layer which covers the entire inner wall electrodes including adjoining parts of the discharge vessel wall.

The selection of the suitable thickness of the dielectric impeding layer is essentially determined by physical discharge requirements and is of the order of magnitude of 50 $\mu$m and several hundred $\mu$m, in particular in the range of between 50 and 200 $\mu$m. The material of the dielectric layer is likewise determined essentially by physical discharge requirements, in particular by the desired dielectric properties, for example dielectric coefficient, electric strength etc. Lead borosilicate glass (Pb—B—Si—O), for example, is suitable.

DESCRIPTION OF THE DRAWINGS

The aim below is to explain the invention in more detail with the aid of a plurality of exemplary embodiments. In the drawing.

DETAILED DESCRIPTION OF THE INVENTION

Figure 1A:
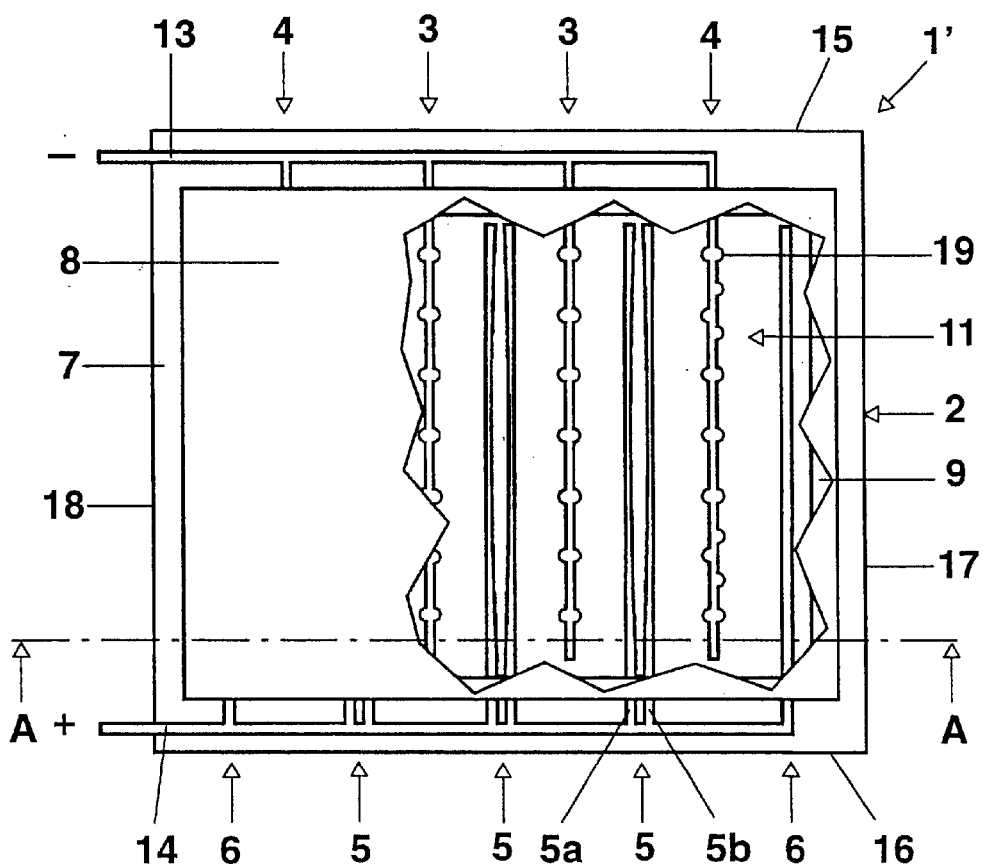
FIG. 1a shows a schematic representation of a partially cutaway plan view of a flat discharge lamp according to the invention and having electrodes arranged on the base plate.
Figure 1B:
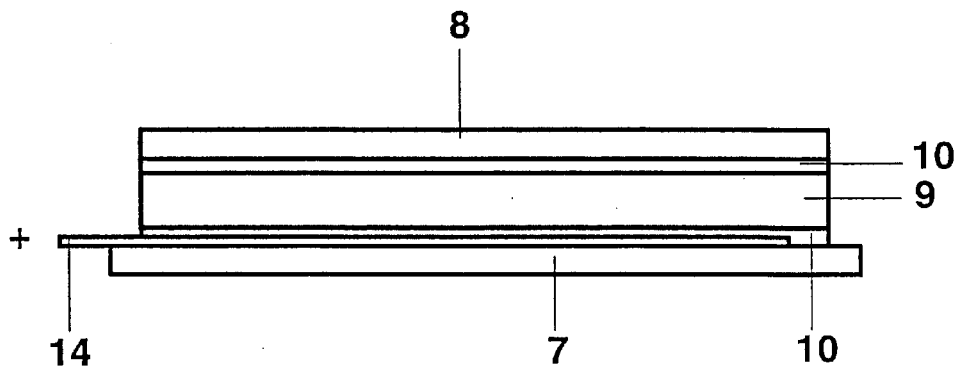
FIG. 1b shows a schematic representation of a side view of the flat lamp from FIG. 1a, FIG. 1c shows a partial sectional schematic representation of the flat lamp from FIG. 1a along the line AA.
Figure 1C:
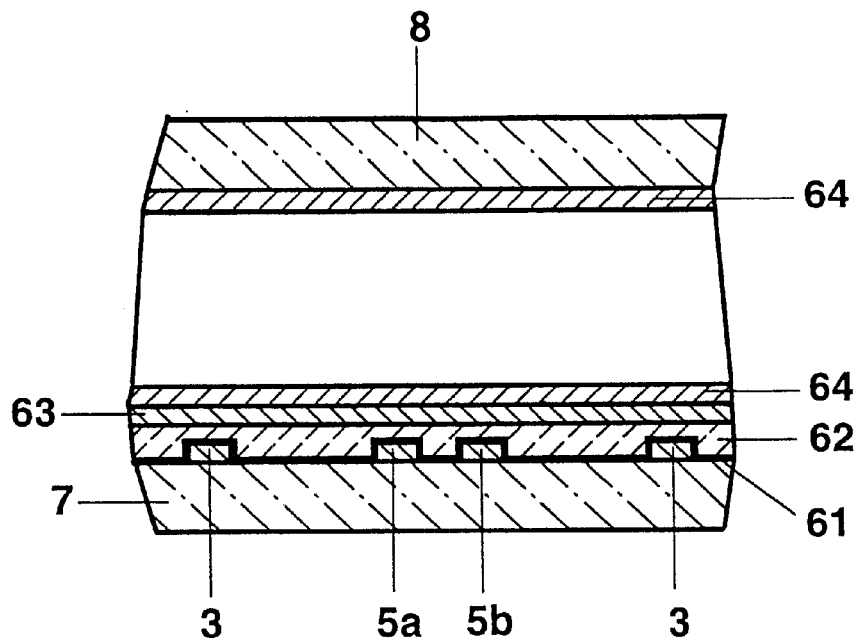

FIGS. 1a, 1b and 1c show schematic representations of a plan view, a side view or a partial section along the line AA of a flat fluorescent lamp which emits white light when in operation. It is intended as background illumination for an LCD (Liquid Crystal Display).

The flat lamp 1 comprises a flat discharge vessel 2 with a rectangular base surface, four strip-like metal cathodes 3, 4 (−) and anodes (+), of which three are formed as elongated double anodes 5 and two are formed as individual strip-like anodes 6. The discharge vessel 2 comprises, for its part, a base plate 7, a front plate 8 and a frame 9. The base plate 7 and front plate 8 are respectively connected in a gastight fashion to the frame 9 by means of glass solder 10 in such a way that the interior 11 of the discharge vessel 2 is of cuboid construction. The base plate 7 is larger than the front plate 8 in such a way that the discharge vessel 2 has a circumferential free-standing edge. The perforation in the front plate 8 merely serves representational purposes and exposes the view onto a portion of the cathodes 3, 4 and anodes 5, 6.

The cathodes 3, 4 and anodes 5, 6 are arranged alternately and parallel on the inner wall of the base plate 7. The anodes 6, 5 and cathodes 3, 4 are lengthened in each case at one end and are guided outward on both sides on the base plate 7 from the interior 11 of the discharge vessel 2. At the edge of the base plate 7, the electrode strips 3, 4, 5, 6 merge in each case into a bus-like external supply lead on the cathode side 13 or anode side 14, respectively. The two outer supply leads 13, 14 serve as contacts for connecting to an electric supply source (not illustrated).

In the interior 11 of the discharge vessel 2, the electrodes 3–6 and the adjacent discharge vessel wall are completely covered (compare FIG. 1c) with a sintered glass ceramic layer 61 made from Bi—B—Si—O which acts as barrier layer and whose thickness is approximately 6 $\mu$m. For its part, the barrier layer 61 is completely covered with a dielectric impeding layer 62 made from Pb—B—Si—O whose thickness over the electrodes is approximately 250 $\mu$m. What is involved here, therefore, is a bilateral dielectric impediment. The barrier layer 61 prevents metal ions diffusing out of the electrodes 3–6 into the dielectric impeding layer 62. A reflector layer 63 made from TiO$_2$ and whose thickness is approximately 4 $\mu$m is applied to the dielectric impeding layer 62. Applied to the reflector layer 63 itself and to the inner wall of the front plate 8 is a fluorescent mixed layer 64 (for the sake of clarity, the layers are not illustrated in FIG. 1a; compare, however, FIG. 1c) which converts the UV/VUV radiation generated by the discharge into visible white light. What is involved here is a three-band phosphor with the blue component BAM (BaMgAl$_{10}$O$_{17}$:Eu$^{2+}$), the green component LAP (LaPO$_4$: [Tb$^{3+}$,Ce$^{3+}$]) and the red component YOB ([Y,Gd]BO$_3$:Eu$^{3+}$). The thickness of the fluorescent mixed layer 63 is approximately 30 $\mu$m.

In one variant (not illustrated), a further reflecting layer made from Al$_2$O$_3$ is arranged between the TiO$_2$ layer and the fluorescent layer. The reflecting effect is improved in this way. The thickness of the Al$_2$O$_3$ layer is approximately 5 $\mu$m.

The electrodes 3–6 including lead-throughs and external supply leads 13, 14 are constructed in each case as a coherent cathode-side or anode-side layer-like structure resembling a conductor track. These two layer-like structures and the further functional layers following thereupon—barrier layer 61, dielectric impeding layer 62, reflecting layer 63 and fluorescent layer 64—are applied by screen printing in the specified sequence directly onto the base plate 7 or, if appropriate, to the front plate 8.

After application of the layers 61–64, the base plate 7 together with the frame 9, and the latter, in turn, together with the front plate 8 are respectively fused by means of glass solder 10 to form the complete flat lamp 1. The thermal joining operation is performed, for example, in a vacuum oven. Before the components of the discharge vessel are fused, the interior 11 of the flat lamp 1 is filled with xenon at a filling pressure of 10 kPa.

The two anode strips 5a, 5b of each anode pair 5 are widened in the direction of the two edges 15, 16 of the flat lamp 1 which are oriented perpendicularly to the electrode strips 3–6 and, to be precise, asymmetrically exclusively in the direction of the respective partner strip 5b or 5a. The maximum distance between the two strips of each anode pair 5 is approximately 4 mm, and the smallest distance is approximately 3 mm. The two individual anode strips 6 are each arranged in the immediate vicinity of the two edges 17, 18 of the flat lamp 1 which are parallel to the electrode strips 3–6.

The cathode strips 3; 4 have nose-like semicircular projections 19 facing the respective adjacent anode 5; 6. They cause locally limited amplifications of the electric field, and consequently cause the delta-shaped individual discharges (not illustrated in FIG. 1a) produced in the unipolar pulsed operation in accordance with WO 94/23442 to be struck exclusively at these points. The distance between the projections 19 and the respective immediately adjacent anode strip is approximately 6 mm. The radius of the semicircular projections 19 is approximately 2 mm. Since the concrete configuration of the electrodes is only of subordinate importance here, reference is made in this connection to DE 196 36 965 A1 and/or DE 197 11 892 A1.

Figure 2:
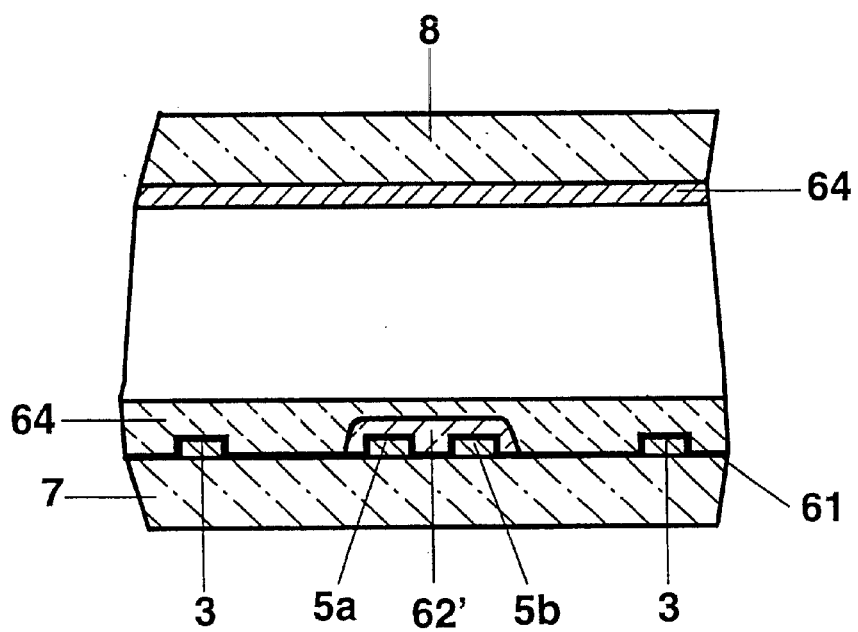
FIG. 2 shows a partial sectional schematic representation of a variant of the flat lamp from FIG. 1a along the line AA.

FIG. 2 shows a partial representation of a variant of the flat lamp from FIG. 1a along the line AA. Identical features are provided with identical reference numerals. By contrast with the representation in FIG. 1c, what is involved here is a unilateral dielectric impediment, that is to say that only respectively the anodes (5a, 5b) are covered with a 250 $\mu$m thick dielectric impeding layer 62' made from lead borosilicate glass. At the same time, in this exemplary embodiment, as well, all the electrodes, that is to say also the cathodes 3, 4 are covered directly with a 6 $\mu$m thick barrier layer 61 made from Bi—B—Si—O. The dielectric impeding layer 62' is thus arranged above the barrier layer 61 and, moreover, only in the region of the anodes (5a, 5b). During the "burning in" of the dielectric impeding layer 62', and also later during the operation of the lamp, the barrier layer 61 protects the cathodes, which are not provided with the dielectric impeding layer 62', against evaporation. An approximately 150 $\mu$m thick fluorescent mixed layer 64 is arranged directly on the dielectric impeding layer 62' (anodes) or the barrier layer 61 (cathodes and adjacent inner wall between the electrodes). This relatively thick fluorescent mixed layer 64 acts at the same time as the UV reflecting layer. Consequently, a separate reflecting layer is dispensed with in this simple variant. By contrast, the fluorescent mixed layer 64 is thinner on the inner wall of the front plate 8 so that it is transparent to visible light.

The fluorescent layer on the base plate and the front plate is omitted for pure UV radiators. For reasons of efficiency, however, in this case one or more UV-reflecting layers will not be omitted on the base plate.

Within the scope of the invention, it is possible to conceive of even further additional layers and layer arrangements without losing the advantageous effect of the invention. The only essential thing here is that the barrier layer, which prevents the metal ions of the electrodes from diffusing into the upper layers and, in particular, into the dielectric impeding layer which is critical for the dielectrically impeded discharge is arranged directly on the electrodes.

It may be pointed out again at this juncture that the layers illustrated in a very schematic fashion in FIGS. 1c and 2 need not necessarily be extended over the entire surface of the base plate. All that is essential is that at least the respectively relevant or, if appropriate, each electrode is completely covered with the corresponding layers. Furthermore, the individual layers need not necessarily be entirely flat, as they are illustrated in a simplified way in FIGS. 1c and 2. However, the individual layers, in particular the very thin layers, can in practice also be inherently non-flat. This is to be seen, in particular, whenever one or more layers are thinner than the electrodes, and the layer(s) consequently still recognizably form the surface shape of the base plate with the electrodes.

A further exemplary embodiment (not represented), is a tubular aperture lamp. Apart from the different shape of the discharge vessel, the main difference by comparison with the flat lamp from FIG. 1 is the method of production, which is coordinated with the altered shape of the vessel. In particular, here the phosphor can no longer be applied to the inner wall or the further functional layers previously arranged thereon using a printing technique but, for example, by means of a slurry. The principle of the sequence and the function of the individual functional layers, in particular the effect according to the invention of the barrier layer, which limits the diffusion of the metal ions of the electrodes into the dielectric impeding layer, correspond to those from FIG. 1.

What is claimed is:

1. A discharge lamp (1), suitable for operating by means of a dielectrically impeded discharge, having
   a discharge vessel (2),
   metal electrodes (3–6), at least a portion of electrodes (3–6) being arranged on the inner wall of the discharge vessel (2),
   at least one dielectric layer (62; 62'), which covers at least a portion of the inner wall electrodes (3–6) and acts as a dielectric impediment for the inner wall electrodes (3–6)
   wherein
   at least that portion of the inner wall electrodes (3–6; 5a, 5b) which is covered with a dielectric impeding layer (62; 62') is additionally directly covered with a dielectric barrier layer (61) arranged between the inner wall electrodes (3–6; 5a, 5b) and the dielectric impeding layer (62; 62'), wherein the dielectric barrier layer consists of a Bi—B—Si—O sintered glass ceramic or a Sn—Zn—P—O partially crystallized glass solder.

2. The discharge lamp as claimed in claim 1, wherein the thickness of the barrier layer (61) is approximately 1 $\mu$m or more.

3. The discharge lamp as claimed in claim 1, wherein the thickness of the barrier layer (61) is in the range of between 1 $\mu$m and 40 $\mu$m.

4. The discharge lamp as claimed in claim 1, wherein the thickness of the dielectric impeding layer (62; 62') over the electrodes is approximately 50 $\mu$m or more.

5. The discharge lamp as claimed in claim 1, wherein the thickness of the barrier layer (61) is in the range of between 5 $\mu$m and 20 $\mu$m.

6. The discharge lamp as claimed in claim 1, wherein the thickness of the dielectric impeding layer (62; 62') over the electrodes is in the range of between 50 and 200 $\mu$m.

7. The discharge lamp as claimed in claim 1, wherein the thickness of the barrier layer (61) is smaller than the thickness of the impeding layer.

8. The discharge lamp as claimed in claim 1 wherein the thickness of the barrier layer is smaller than the thickness of the dielectric impeding layer.

9. The discharge lamp as claimed in claim 8 wherein the thickness of the barrier layer is in the range of between 1 μm and 40 μm and the thickness of the dielectric impeding layer is in the range of between 50 μm and 200 μm.

10. A discharge lamp suitable for operating by means of a dielectrically impeded discharge, the discharge lamp comprising: a discharge vessel and metal electrodes, at least a portion of the electrodes being arranged on an inner wall of the discharge vessel, at least one dielectric impeding layer covering at least a portion of the electrodes, at least that portion of the electrodes which is covered with the dielectric impeding layer being additionally directly covered with a dielectric barrier layer arranged between the electrodes and the dielectric impeding layer, the thickness of the barrier layer being smaller than the thickness of the dielectric impeding layer.

11. The discharge lamp as claimed in claim 10 wherein the thickness of the barrier layer is approximately 1 μm or more.

12. The discharge lamp as claimed in claim 10 wherein the thickness of the dielectric impeding layer is approximately 50 μm or more.

13. The discharge lamp as claimed in claim 10 wherein the thickness of the barrier layer is in the range of between 1 μm and 40 μm.

14. The discharge lamp as claimed in claim 13 wherein the thickness of the dielectric impeding layer is in the range of between 50 μm and 200 μm.

15. The discharge lamp as claimed in claim 10 wherein the thickness of the barrier layer is in the range of between 1 μm and 30 μm.

16. The discharge lamp as claimed in claim 10 wherein the thickness of the barrier layer is in the range of between 5 μm and 20 μm.

* * * * *